(12) United States Patent
Sommerkorn et al.

(10) Patent No.: US 11,746,864 B2
(45) Date of Patent: Sep. 5, 2023

(54) LEVEL ADJUSTMENT DEVICE FOR A MOTOR VEHICLE

(71) Applicant: Schaeffler Technologies AG & Co. KG, Herzogenaurach (DE)

(72) Inventors: Sebastian Sommerkorn, Weisendorf (DE); Wilfried Breton, Altdorf (DE); Markus Holzberger, Emskirchen (DE); Tim Bartling, Aachen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 344 days.

(21) Appl. No.: 16/767,650

(22) PCT Filed: Nov. 29, 2018

(86) PCT No.: PCT/DE2018/100971
§ 371 (c)(1),
(2) Date: May 28, 2020

(87) PCT Pub. No.: WO2019/114865
PCT Pub. Date: Jun. 20, 2019

(65) Prior Publication Data
US 2020/0370628 A1     Nov. 26, 2020

(30) Foreign Application Priority Data
Dec. 15, 2017 (DE) .................... 10 2017 130 073.2

(51) Int. Cl.
*B60G 17/02* (2006.01)
*F16H 25/22* (2006.01)
(Continued)

(52) U.S. Cl.
CPC ....... *F16H 25/2204* (2013.01); *B60G 17/021* (2013.01); *F16H 1/20* (2013.01);
(Continued)

(58) Field of Classification Search
CPC .... F16H 2025/2081; F16H 55/08; F16H 1/08; F16H 55/06; F16H 19/08; F16H 25/20;
(Continued)

(56) References Cited

U.S. PATENT DOCUMENTS 2,403,092 A * 7/1946 Lear ...................... F16H 25/205
184/6.12
3,247,736 A * 4/1966 Roth ................... F16H 55/0806
74/462

(Continued)

FOREIGN PATENT DOCUMENTS

CN        104588706 A      5/2015
DE    102007026606 A1    12/2008
(Continued)

OTHER PUBLICATIONS

Roth, Karlheinz; Gear Technology Involute Special Gears for Gearbox Improvement.1st edition, Springer-Verlag Berlin Heidelberg, 1998. https://doi.org/10.1007/978-3-642-58890-7.

*Primary Examiner* — Gregory Robert Weber

(57) ABSTRACT

A device for adjusting the level of a motor vehicle comprises an electric motor (4) and an actuating gear (3) which is connected upstream of a screw drive (2). The actuating gear (3) is formed by three series-connected gears (14, 15, 16) with parallel rotation axes (D14, D15, D16). An input gear (14), the number of teeth of which is at least one and at most five, is coupled to the motor shaft (17) of the electric motor (4) for conjoint rotation. The input gear engages with an intermediate gear (15) which engages with an output gear (16) which is connected to a nut (9) of the screw drive (2) for conjoint rotation.

20 Claims, 3 Drawing Sheets

(51) Int. Cl.
*F16H 1/20* (2006.01)
*F16H 25/20* (2006.01)

(52) U.S. Cl.
CPC .... *B60G 2202/42* (2013.01); *B60G 2204/418* (2013.01); *B60G 2204/419* (2013.01); *B60G 2500/30* (2013.01); *F16H 2025/2081* (2013.01)

(58) Field of Classification Search
CPC ... F16H 25/2204; F16H 1/20; B60G 2202/42; B60G 2204/4191; B60G 2204/4193; B60G 2204/419
See application file for complete search history.

(56) References Cited

U.S. PATENT DOCUMENTS

| | | | | |
|---|---|---|---|---|
| 8,585,124 | B2* | 11/2013 | Oberle | E05F 15/603 74/421 A |
| 9,694,643 | B2* | 7/2017 | Mersmann | B60G 17/005 |
| 9,791,026 | B2* | 10/2017 | Saxstetter | F16H 55/0806 |
| 10,240,663 | B2* | 3/2019 | Nickel | E05F 15/603 |
| 10,648,545 | B2* | 5/2020 | Mizuuchi | H02K 7/06 |
| 10,683,880 | B2* | 6/2020 | Fenn | F15B 15/19 |
| 2010/0096498 | A1* | 4/2010 | McKay | B64D 45/0005 244/99.2 |
| 2011/0180737 | A1* | 7/2011 | Moench | F16K 31/535 251/248 |
| 2014/0166413 | A1 | 6/2014 | Giering | |
| 2017/0240114 | A1* | 8/2017 | Brouwer | B60R 1/072 |

FOREIGN PATENT DOCUMENTS

| | | | |
|---|---|---|---|
| DE | 10 2007 004 747 B4 | 2/2010 | |
| DE | 102014215420 A1 | 2/2015 | |
| DE | 102015204328 A1 * | 9/2015 | ........... B60T 11/04 |
| DE | 10 2015 206 149 A1 | 1/2017 | |
| EP | 0386771 A1 | 9/1990 | |
| EP | 2332756 A2 | 6/2011 | |
| FR | 2591701 A1 | 6/1987 | |
| JP | 2008006868 A * | 1/2008 | ........... F16H 25/20 |
| WO | 2005007487 A1 | 1/2005 | |
| WO | 2006114265 A1 | 11/2006 | |
| WO | 2015/021980 A1 | 2/2015 | |
| WO | 15154763 A1 | 10/2015 | |

* cited by examiner

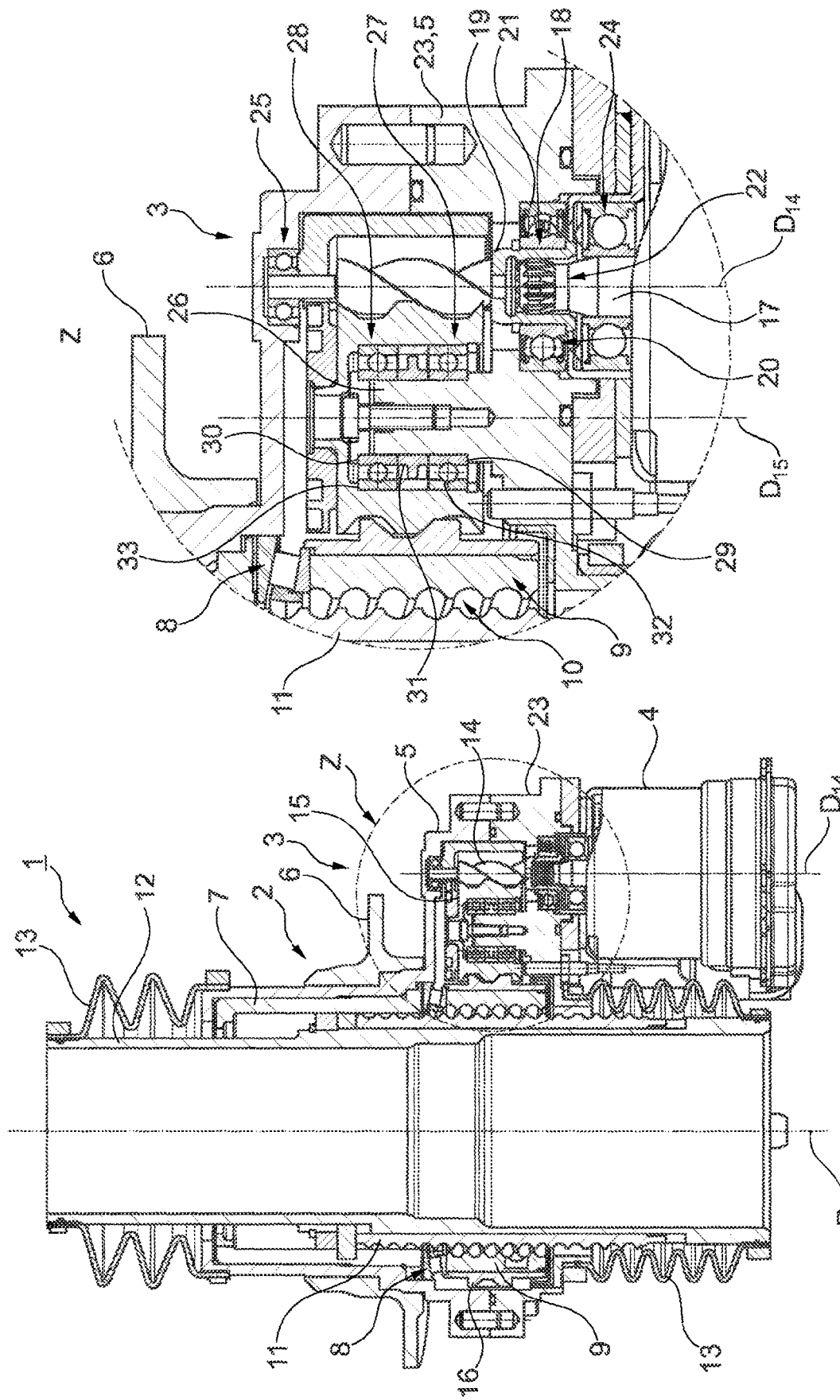

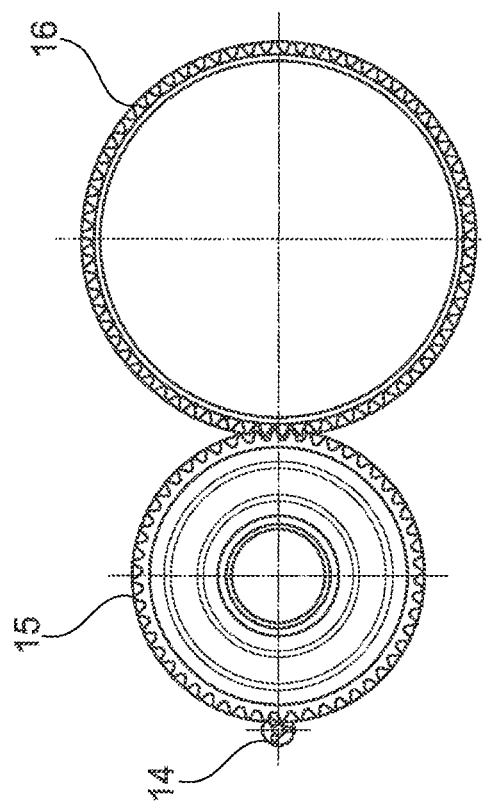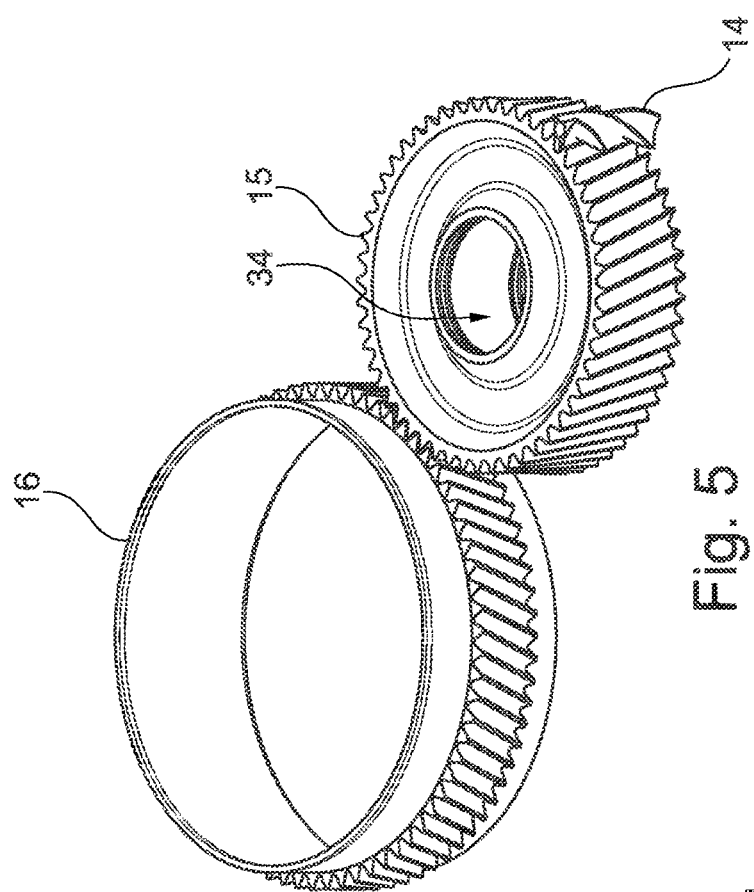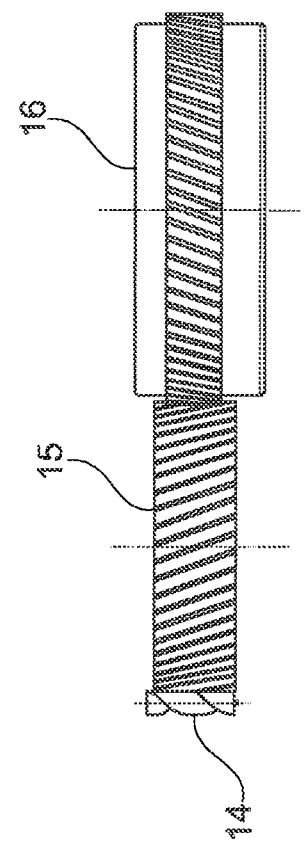

LEVEL ADJUSTMENT DEVICE FOR A MOTOR VEHICLE

CROSS-REFERENCE TO RELATED APPLICATIONS

This application is the U.S. National Phase of PCT Appln. No. PCT/DE2018/100971 filed Nov. 29, 2018, which claims priority to DE 10 2017 130 073.2 filed Dec. 15, 2017, the entire disclosures of which are incorporated by reference herein.

TECHNICAL FIELD

The disclosure relates to an electromechanical device for level control suitable for a motor vehicle.

BACKGROUND

A level control device, i.e. a device for adjusting the height of a vehicle body, is known from DE 10 2014 215 420 A1, for example. The known height adjustment device comprises two components which can be moved relative to each other between an upper and a lower adjustment position by means of a motion thread, whereby the motion thread can be actuated by an electric motor. The electric motor introduces a torque into the motion thread, i.e. a ball screw drive, through an actuating gear, which can be designed as a gear or belt drive.

Other devices provided for height adjustment of a vehicle body are disclosed, for example, in documents WO 2015/021980 A1 and DE 10 2015 206 149 A1. Each of these devices contains a ball screw drive.

A height adjustment device for wheel suspensions of motor vehicles known from DE 10 2007 004 747 B4 also has a ball screw drive for converting rotation into linear motion. The ball screw drive comprises a rotatable adjusting ring which is located inside a non-rotatably displaceable outer sleeve, wherein balls roll as roller elements between the adjusting ring and the outer sleeve. A radially outward projecting gear is formed on the adjusting ring and meshes with a drive pinion of an electric motor.

SUMMARY

The object of the invention is to expand the application possibilities of electromechanical level control devices.

The electromechanical level control device for use in a motor vehicle has a screw drive which is situated downstream of a further drive, known as an actuating gear, which can be actuated by an electric motor. The actuating gear is designed as a spur gear, which is formed by three series-connected gears with parallel rotation axes, wherein an input gear is coupled to the motor shaft of an electric motor for conjoint rotation and meshes with an intermediate gear which meshes with an output gear which is connected to a nut of the screw drive.

A three-wheeled chain is formed by the three gears of the actuating gear, whose overall gear ratio is given by the ratio between the number of teeth of the output gear and the number of teeth of the input gear. The intermediate gear must be dimensioned according to the given installation space conditions and has no influence on the overall gear ratio of the actuating gear designed as a reduction gear. As an option, the input gear is designed in one piece with the motor shaft.

The three gears of the actuating gear may be helical gears. Their helix angle may be at least 15 degrees and not more than 30 degrees, in particular at least 18 degrees and not more than 25 degrees. The helical gearing of the three gears makes it possible to use an input gear with a very small number of teeth.

The number of teeth of the input gear is at least one and at most five, for example two or three. In this context, reference is made to the following textbook:

Roth, Karlheinz: Gearing technology—Special involute gears for gear improvement; Springer-Verlag Berlin Heidelberg 1998; ISBN 978-3-642-63778-0

See section 1.6 ("The selected evoloid gears") for examples of helical gears with numbers of teeth between 1 and 5 (FIG. 1.6). Each of these designs is suitable for the actuating gear of the level control device.

Due to a number of teeth smaller than 5, the profile coverage is reduced to a value smaller than 1. Compared to spur gears, helical gears generally offer the advantage of an overlap ratio. The overlap ratio plus transverse plus the contact ratio equals the total contact ratio. The helical gearing ensures a total contact ratio greater than 1, so that a continuous tooth mesh can be achieved even with a small number of teeth.

An addendum modification coefficient must take into account on the one hand the aspect of a possible meshing interference due to an undercut and on the other the aspect of tooth root safety. A positive addendum modification coefficient is preferably selected for the input gear of the actuating gear of the leveling control device.

A particularly good use of space is achieved in embodiments where the axis of rotation of the intermediate gear intersects the electric motor, especially its stator. In a design which is particularly advantageous from the perspective of production technology and with respect to mechanical loads occurring during operation, a housing element of the actuating gear has a hole and a cone, wherein an outer bearing ring for the bearing of the input gear is held in the hole and at least one bearing inner ring of a bearing of the intermediate gear held on the cone.

According to a further possible embodiment, two housing elements of the actuating gear, which are firmly connected to each other, each have a hole, which also means a blind hole-like recess, whereby in each of the two holes a bearing outer ring of a roller bearing for bearing the input gear is held and precisely one of said housing elements has a cone on which at least one bearing inner ring of a bearing, in particular a roller bearing, of the intermediate gear is held. In this case, the axis of rotation of the intermediate gear preferably does not intersect the electric motor.

In both embodiments, the bearing, in particular roller bearing, of the intermediate gear is preferably located completely between the two end faces of the intermediate gear, i.e. in an at least approximately cylindrical cavity formed by the intermediate gear. In contrast, the input gear is preferably supported by bearings, especially roller bearings, which are each located in front of one end face of the input gear. In other words: The toothing of the input gear is located axially between the two bearings with which the input gear is supported. In principle, a cantilevered bearing is also possible, i.e. a bearing on only one face of the input gear, i.e. the side facing the electric motor.

The number of teeth of the intermediate gear may be smaller than the number of teeth of the output gear, but larger than the number of teeth of the input gear. Depending on the given installation space conditions, embodiments are also possible in which the intermediate gear is the largest of the three gears. In general, the number of teeth of the gears can be adapted to the requirements, especially depending on the wheel load. In the case of the intermediate gear, the installation space conditions are decisive.

The overall gear ratio of the actuating gear may be at least 10 and at most 100, which is mainly made possible by the low number of teeth of the input gear. In this context, ratios between 10 and 25 mainly for vehicles with small to medium wheel loads and ratios between 25 and 100 mainly for vehicles with high wheel loads can be considered.

The output gear of the actuating gear may be designed to directly surround the nut of the screw drive, especially the ball screw drive. Optionally, the functions of the output gear and the nut of the screw drive are implemented by a single component.

The level control device is suitable for both passenger cars and commercial vehicles. In both cases, either a single axle or several axles of the vehicle may be equipped with the level control device, in particular in the form of a level control.

BRIEF DESCRIPTION OF THE DRAWINGS

In what follows, two embodiments are explained in more detail by means of a drawing. Wherein:

FIG. 1 is a first embodiment of an electromechanical level control device in a sectional view, FIG. 2 is a detail of the arrangement according to FIG. 1, FIGS. 3 to 5, in different views show gears of an actuating gear of the level control device according to FIG. 1.

DETAILED DESCRIPTION

Figure 6:
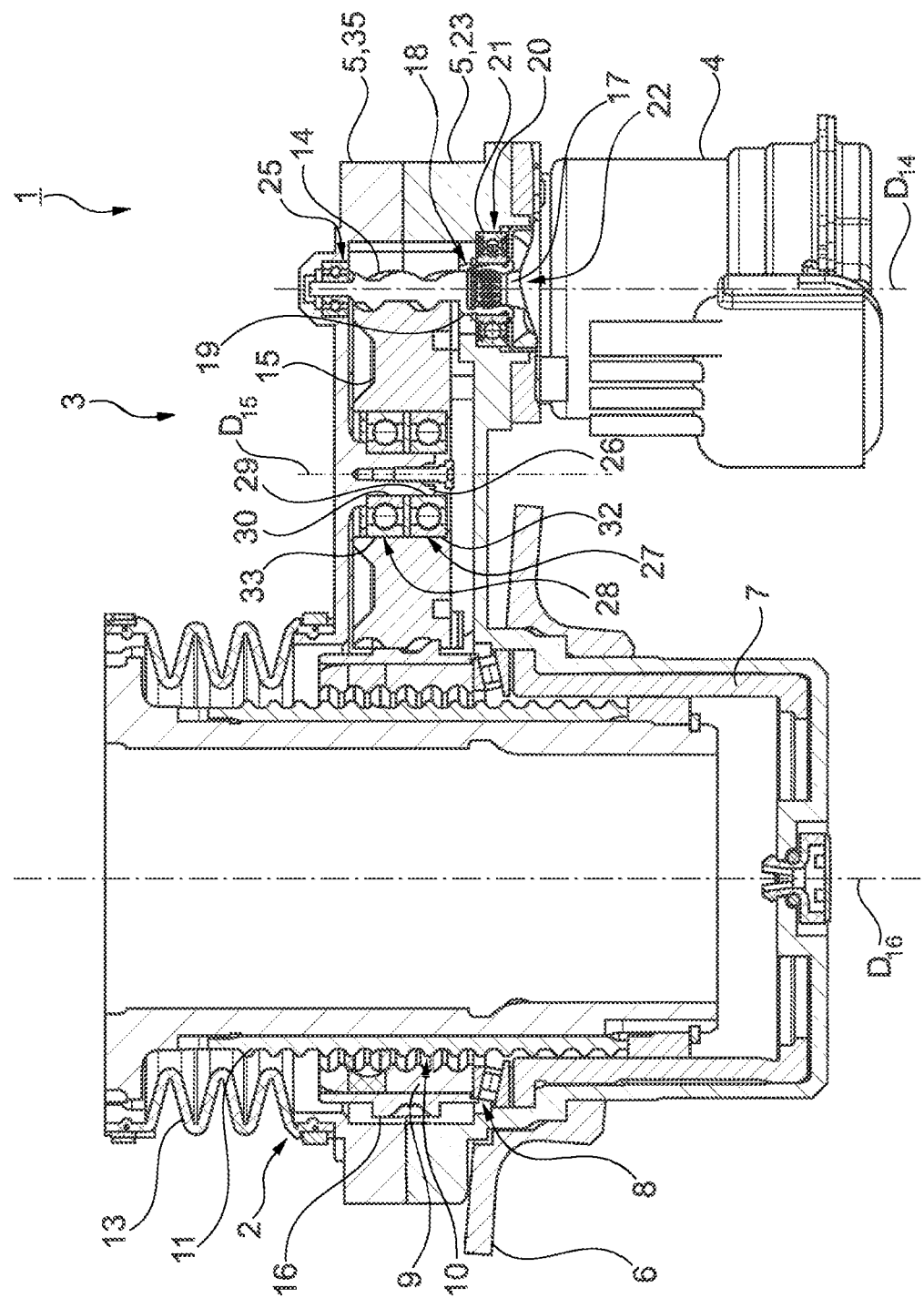
FIG. 6 is a second embodiment of an electromechanical level control device in a representation similar to FIG. 1.

An electromechanical level control device, generally marked with the reference symbol 1, is intended for use in a motor vehicle, in particular a passenger car. With regard to the basic function of the level control device 1, reference is made to the prior art cited at the beginning.

FIGS. 1 to 5 refer to a leveling control device 1 for the front axle, FIG. 6 refers to a leveling control device 1 for the rear axle of the motor vehicle. Parts that correspond to each other or have basically the same effect are marked with the same reference symbols in all figures. Unless otherwise stated, the following explanations refer to both exemplary embodiments.

The level control device 1 comprises a screw drive 2, namely a ball screw drive, which is operated by an electric motor 4 through an actuating gear 3, which is described in more detail below. A housing 5 of the actuating gear 3 is firmly connected to a spring plate 6 and a sleeve 7. A roller bearing 8 is supported on the sleeve 7 and on the housing 5, which in this case is designed as an angular contact roller bearing and serves to support a nut 9, which is part of the screw drive 2. During operation of the screw drive 2, balls roll on a helically wound ball track 10 of the nut 9, and simultaneously contact a hollow threaded spindle 11 also belonging to the screw drive 2. The threaded spindle 11 is movably but not rotatably guided in the sleeve 7 and firmly connected to a damper tube 12. The bellows 13 serves to secure the seal between the damper tube 12 and the housing 5.

The actuating gear 3 is designed as a three-gear chain consisting of an input gear 14, an intermediate gear 15 and an output gear 16. The rotation axes of the three gears 14, 15, 16 are marked D14, D15 and D16. The axis of rotation D14 of the input gear 14 is identical to the axis of the electric motor 4. The motor shaft of the electric motor 4, marked 17, is coupled to the input gear 14 via coupling 18 for conjoint rotation. A coupling element marked 19, which is to be assigned to the coupling 18, is firmly connected to the input gear 14 or is identical to it. The coupling element 19 is supported by a ball bearing 20 in the housing 5. An outer ring 21 of the ball bearing 20 is inserted into a hole 22, which is formed in a housing element 23 of the housing 5. A further ball bearing 24 is provided for the bearing the motor shaft 17. Alternatively, the function of the two ball bearings 20, 24 can be taken over by a single bearing, especially roller bearings. The end of the input gear 14 facing away from the electric motor 4 is supported in the housing 5 by a further ball bearing 25. Thus the two ball bearings 20, 25 are each positioned in front of one face of the input gear 14.

The input gear 14 is designed as a helical gear with only three teeth. The intermediate gear 15 driven by the input gear 14 has a comparatively high number of teeth and is mounted on a cone 26, which is formed by the housing element 23 in the embodiment shown in FIG. 1. In the embodiment shown in FIG. 6, on the other, the cone 26 is formed by a housing element 35, which houses the ball bearing 25.

In both cases there are two roller bearings 27, 28, namely ball bearings, on the cone 26. The inner rings of roller bearings 27, 28 are designated 29, 30, with an intermediate ring 31 located between the two inner rings 29, 30 of roller bearings 27, 28, which keeps them at a defined distance from each other. The associated outer rings 32, 33 of the roller bearings 27, 28 are inserted into a central opening 34 in the intermediate gear 15.

In the embodiment shown in FIG. 1, the axis of rotation D15 of the intermediate gear 15 only intersects the electric motor 4. On the other hand, the axis of rotation D15 of the intermediate gear 15 passes the electric motor 4 in the case of FIG. 6. In both cases all rotation axes D14, D15, D16 are arranged parallel to each other, wherein the rotation axis D16 of the output gear 16 is identical to the central axis of the damper tube 12 and the sleeve 7. In contrast to the intermediate gear 15, the output gear 16 does not have its own bearing. Instead, the output gear 16 is firmly connected to the nut 9, and directly encloses it.

The output gear 16 is the largest of the three gears 14, 15, 16. The gear ratio of the actuating gear 3 is given by the ratio between the number of teeth of the output gear 16 and the number of teeth of the input gear 14 and is 70/3=23.33 in the present cases. Within the entire level control system 1, the setting wheel 3 according to FIG. 1 requires only a very small installation space. In the case of FIG. 6, however, the extent of the actuating gear 3 in the radial direction is slightly increased to adapt to an existing surrounding structure. The compact design of the actuating gear 3 in both cases, especially in the axial direction, with respect to the rotation axes D14, D15 and D16, also has the advantage that undesirable forces and tilting moments are largely avoided. It is also particularly robust with regard to the effects of vibrations. The level control device 1 is particularly suitable as a component of a level control system.

LIST OF REFERENCE SYMBOLS

1 Level control device
2 Screw drive
3 Actuating gear
4 Electric motor
5 Housing 6 Spring plate
7 Sleeve
8 Roller bearings
9 Nut
10 Ball track
11 Threaded spindle
12 Damper tube
13 Bellows
14 Input gear
15 Intermediate gear
16 Output gear
17 Motor shaft
18 Coupling
19 Coupling element
20 Ball bearing
21 Outer Ring
22 Hole
23 Housing element
24 Ball bearing
25 Ball bearing
26 Cone
27 Roller bearing
28 Roller bearing
29 Inner Ring
30 Inner Ring
31 Intermediate ring
32 Outer Ring
33 Outer Ring
34 Central opening
35 Housing element
$D_{14}$ Rotation axis of the input gear
$D_{15}$ Rotation axis of the intermediate gear
$D_{16}$ Rotation axis of the output gear

The invention claimed is:

1. An electromechanical level control device for a motor vehicle, comprising:
    an electric motor having a shaft;
    an actuating gear comprising:
        an input gear coupled to the shaft for conjoint rotation, the input gear having at least one and at most five teeth;
        an intermediate gear engaged with the input gear; and
        an output gear engaged with the intermediate gear; and
        the input gear, the intermediate gear, and the output gear are connected in series and have manually parallel rotation axes; and
    a screw drive comprising:
        a hollow threaded spindle;
        a tube disposed within and attached to the hollow threaded spindle; and
        a nut;
            coupled to the output gear; and
            drivably engaged with the hollow threaded spindle such that rotation of the nut moves the tube, wherein movement of the tube is configured to change a level of the motor vehicle.

2. The level control device according to claim 1, wherein the input gear, the intermediate gear, and the output gear are helical gears.

3. The level control device according to claim 1, wherein the rotation axis of the intermediate gear intersects a stator of the electric motor.

4. The level control device according to claim 3, wherein a housing element of the actuating gear has a hole and a cone, wherein a bearing outer ring for mounting the input gear is held in the hole and at least one bearing inner ring of a bearing of the intermediate gear is held on the cone.

5. The level control device according to claim 1, wherein two housing elements of the actuating gear each have a hole in which a bearing outer ring of a roller bearing for supporting the input gear is held, and one of these housing elements has a cone on which at least one bearing inner ring of a bearing of the intermediate gear is held.

6. The level control device according to claim 1, wherein a number of teeth of the intermediate gear is smaller than a number of teeth of the output gear and larger than the number of teeth of the input gear.

7. The level control device according to claim 1, wherein a total gear ratio of the actuating gear is at least 10 and at most 100.

8. The level control device according to claim 1, wherein the output gear directly encloses the nut of the screw drive and the screw drive is a ball screw drive.

9. The level control device of claim 1, wherein a toothing of the input gear is arranged axially between two roller bearings.

10. The level control device of claim 1, further comprising a housing sealed to the tube, and the housing is configured to cover at least a portion of the input gear, intermediate gear, and output gear.

11. The level control device of claim 10, further comprising a bellows configured to seal the tube to the housing.

12. A level control device for a motor vehicle comprising:
    an electric motor having a motor shaft supported to rotate about a motor shaft axis;
    a screw drive having an axis parallel to the motor shaft axis, the screw drive comprising:
        a hollow threaded spindle;
        a tube disposed within and attached to the hollow threaded spindle; and
        a nut drivably engaged with the hollow threaded spindle such that rotation of the nut moves the tube, wherein movement of the tube is configured to change a level of the motor vehicle;
    an input gear fixed to the motor shaft and having at least one and at most five teeth;
    an intermediate gear engaged with the input gear and supported for rotation about a rotation axis parallel to the motor shaft axis; and
    an output gear engaged with the intermediate gear and fixed to the nut of the screw drive.

13. The level control device according to claim 12, wherein the input gear, intermediate gear, and output gear are all helical gears with a helix angle.

14. The level control device according to claim 12, wherein the rotation axis of the intermediate gear intersects a stator of the electric motor.

15. The level control device according to claim 14, wherein a housing element has a hole and a cone, wherein a bearing outer ring for mounting the input gear is held in the hole and at least one bearing inner ring of a bearing of the intermediate gear is held on the cone.

16. The level control device according to claim 12, wherein two housing elements each have a hole in which a bearing outer ring of a roller bearing for supporting the input gear is held, and one of these housing elements has a cone on which at least one bearing inner ring of a bearing of the intermediate gear is held.

17. The level control device according to claim 12, wherein the intermediate gear has more teeth than the input gear and fewer teeth than the output gear.

18. The level control device according to claim 12, wherein a ratio of a number of teeth of the output gear to the number of teeth of the input gear is at least 10 and at most 100.

19. The level control device according to claim 12, wherein the output gear directly encloses the nut of the screw drive and the screw drive is a ball screw drive.

20. The level control device of claim 12, further comprising a housing sealed to the tube, and the housing is configured to cover at least a portion of the input gear, the intermediate gear, and the output gear.

* * * * *